US011242895B2

(12) United States Patent
Birle

(10) Patent No.: US 11,242,895 B2
(45) Date of Patent: Feb. 8, 2022

(54) COUPLING DEVICE

(71) Applicant: Bayerische Motoren Werke Aktiengesellschaft, Munich (DE)

(72) Inventor: Dominik Birle, Gams (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 51 days.

(21) Appl. No.: 16/727,034

(22) Filed: Dec. 26, 2019

(65) Prior Publication Data

US 2020/0132123 A1    Apr. 30, 2020

Related U.S. Application Data

(63) Continuation of application No. PCT/EP2018/068018, filed on Jul. 4, 2018.

(30) Foreign Application Priority Data

Jul. 14, 2017 (DE) ..................... 10 2017 212 060.6

(51) Int. Cl.
  *F16D 1/033* (2006.01)
  *F16D 1/076* (2006.01)
(52) U.S. Cl.
  CPC ............. *F16D 1/033* (2013.01); *F16D 1/076* (2013.01)
(58) Field of Classification Search
  CPC .... F16B 7/182; F16B 2200/506; F16D 1/033; F16D 1/076; Y10T 403/645; Y10T 403/70; Y10T 403/7069
  USPC ............... 464/149, 157; 403/337, 345, 374.4
  See application file for complete search history.

(56) References Cited

U.S. PATENT DOCUMENTS

| 3,952,547 | A  | * | 4/1976 | Klein ...................... F16D 1/033 464/149 |
| 5,051,071 | A  | * | 9/1991 | Haentjens ............... F16D 1/033 417/373 |
| 6,599,050 | B1 | * | 7/2003 | Sjoo ...................... B23B 31/008 403/374.3 |
| 7,997,988 | B2 | * | 8/2011 | Wormsbaecher ....... F16D 1/033 464/145 |
| 9,005,043 | B2 | * | 4/2015 | Watanabe ............... F16D 1/076 464/178 |
| 9,309,926 | B2 | * | 4/2016 | Schuermann ........... F16D 1/076 |

(Continued)

FOREIGN PATENT DOCUMENTS

| CN | 2256054 Y | 6/1997 |
| CN | 1401887 A | 3/2003 |

(Continued)

OTHER PUBLICATIONS

"Resistivity and Electrical Conductivity." Electronics Tutorials. Sep. 5, 2017, [online], [retrieved on May 27, 2021] Retrieved from the Internet <URL: https://web.archive.org/web/20170509012533/https://www.electronics-tutorials.ws/resistor/resistivity.html>.*

(Continued)

*Primary Examiner* — Josh Skroupa
(74) *Attorney, Agent, or Firm* — Crowell & Moring LLP

(57) ABSTRACT

A coupling device for the torque-transmitting connection of a transmission with an electric machine, includes a drive element and an output element which are coupled with each other in a torque-transmitting manner. The drive element and the output element are electrically separated from each other by way of an electrical insulator.

12 Claims, 1 Drawing Sheet

(56) References Cited

U.S. PATENT DOCUMENTS

| | | | |
|---|---|---|---|
| 10,513,148 B2 * | 12/2019 | Fuchs | F16D 1/076 |
| 2003/0052557 A1 | 3/2003 | Toda et al. | |
| 2009/0093317 A1 | 4/2009 | Kajiwara et al. | |
| 2012/0103743 A1 | 5/2012 | Hong | |
| 2016/0352184 A1 | 12/2016 | Kim | |

FOREIGN PATENT DOCUMENTS

| | | | | |
|---|---|---|---|---|
| CN | 101403418 A | | 4/2009 | |
| CN | 101936346 A | | 1/2011 | |
| CN | 201714853 U | | 1/2011 | |
| CN | 201771983 U | | 3/2011 | |
| CN | 102287458 A | | 12/2011 | |
| CN | 202203290 U | | 4/2012 | |
| CN | 102966674 A | | 3/2013 | |
| CN | 104210345 A | | 12/2014 | |
| CN | 106195032 A | | 12/2016 | |
| CN | 205780412 U | | 12/2016 | |
| DE | 26 28 826 A1 | | 2/1978 | |
| DE | 102008047296 A1 | * | 4/2010 | F16D 1/033 |
| DE | 20 2013 010 678 U1 | | 2/2014 | |
| DE | 10 2013 007 126 A1 | | 6/2014 | |
| DE | 10 2013 210 076 A1 | | 12/2014 | |
| DE | 102015220841 A1 | * | 4/2017 | F16D 1/076 |
| JP | 55-84321 U | | 6/1980 | |
| JP | 62-44177 B2 | | 9/1987 | |
| JP | 10-331860 A | | 12/1998 | |
| JP | 2011-47435 A | | 3/2011 | |
| WO | WO 2016/177394 A1 | | 11/2016 | |

OTHER PUBLICATIONS

International Search Report (PCT/ISA/210) issued in PCT Application No. PCT/EP2018/068018 dated Sep. 19, 2018 with English translation (four (4) pages).
German-language Written Opinion (PCT/ISA/237) issued in PCT Application No. PCT/EP2018/068018 dated Sep. 19, 2018 (five (5) pages).
German-language Search Report issued in counterpart German Application No. 102017212060.6 dated Jun. 27, 2018 with partial English translation (11 pages).
Chinese-language Office Action issued in Chinese Application No. 201880032178.0 dated May 6, 2021 with English translation (14 pages).
Chinese-language Office Action issued in Chinese Application No. 201880032178.0 dated Oct. 26, 2021 with English translation (11 pages).

* cited by examiner

COUPLING DEVICE

CROSS REFERENCE TO RELATED APPLICATIONS

This application is a continuation of PCT International Application No. PCT/EP2018/068018, filed Jul. 4, 2018, which claims priority under 35 U.S.C. § 119 from German Patent Application No. 10 2017 212 060.6, filed Jul. 14, 2017, the entire disclosures of which are herein expressly incorporated by reference.

BACKGROUND AND SUMMARY OF THE INVENTION

The invention relates to a coupling device for the torque-transmitting connection of a transmission to an electric machine.

Electromagnetic compatibility (EMC) is increasingly gaining in importance in all areas in which electronics are used in order to reduce electromagnetic disruptive influences. In the automotive area, in particular, in which vehicles are used firstly with a large quantity of sensitive electronics and secondly with powerful electric machines and high performance accumulators, high EMC is decisive, in order to ensure the functional reliability of all the systems and therefore in order for it to be possible for risks in road traffic to be ruled out.

It is known from the prior art to use grounding rings in order to discharge bearing currents and shaft voltages of torque-transmitting transmission parts. As a result, the electromagnetic disruptive influences between the components are reduced and the EMC is improved.

Sleeve-shaped coupling devices are used for the torque-transmitting connection of a transmission to an electric machine, which coupling devices transmit the drive power of the electric machine to the input shaft of the transmission. A grounding ring for discharging electromagnetic currents or waves runs on the outer circumference of the sleeve-shaped coupling device. To this end, the outer circumference is coated, in order to provide an improved conductance. Over time, however, the coating is abraded, as a result of which the EMC is impaired as the age of the coupling device increases.

It is an object of the invention to provide an improved coupling device for the torque-transmitting connection of a transmission to an electric machine.

In order to achieve the object, a coupling device is provided for the torque-transmitting connection of a transmission to an electric machine, having a drive element and an output element which are coupled to one another in a torque-transmitting manner. Here, the drive element and the output element are disconnected electrically from one another by way of an electric insulator. Within the context of the invention, an electric insulator has a low electric conductivity. In particular, an insulator made from stainless steel falls within said category. The drive element is provided to be coupled in a torque-transmitting manner to the electric machine, and the output element is provided to be coupled in a torque-transmitting manner to the transmission. In this way, the coupling element establishes a torque-transmitting connection between the transmission and the electric machine. The fact that the drive element and the output element are disconnected electrically from one another by way of the electric insulator prevents bearing currents and shaft voltages being forwarded from the electric machine to the transmission or vice versa. In this way, electromagnetic influences are insulated and the EMC is improved.

The electric insulator can be formed by way of an electrically insulating layer. In particular, the electric insulator can be provided in the form of a coating, for example consisting of corundum or stainless steel. In this way, the coupling device can be manufactured inexpensively. Furthermore, the coupling device can have low wear and therefore a high service life as a result.

In accordance with one embodiment, the electric insulator can have an electric conductivity of less than $10^7$ S/m, preferably of less than $10^6$ S/m, with preference of less than $10^4$ S/m. Non-conducting materials or materials with a low electric conductivity are particularly suitable for the electric insulator, since, as the electric conductivity decreases, the transmission of electromagnetic currents is increasingly blocked and therefore the EMC is improved.

The drive element and the output element can in each case have a toothing system, by means of which the drive element is coupled to the output element in a torque-transmitting manner. Here, the toothing system can be of any desired design and establishes a positively locking connection which ensures a reliable transmission of torque even in the case of high torques.

In one embodiment, the toothing system is in each case a Hirth toothing system, as a result of which great torques can be transmitted with a design which is at the same time compact.

The electric insulator can be a coating which is provided at least in sections on the toothing system of the drive element and/or the output element. In this way, the coating is provided on the contact faces of the drive element and/or the output element, with the result that they are insulated electrically from one another. Applying the electric insulator to the toothing system in the form of a coating has the advantage that the electric insulator can be connected simply and fixedly to the drive element and/or the output element. If, furthermore, the coating consists of a durable material, such as corundum or stainless steel, the coating withstands even high loads and ensures high EMC over the service life of the coupling device.

In accordance with a further embodiment, the coupling device can comprise a fastening device, by means of which the drive element and the output element are fastened to one another. Here, the fastening device is insulated electrically with respect to the drive element and the output element, as a result of which the fastening device does not form an electric jumper bar between the drive element and the output element. The fastening device ensures that the drive element and the output element are connected fixedly to one another, with the result that even great torques can be transmitted by means of the coupling device.

In a further embodiment, the drive element and the output element are in each case of sleeve-shaped design. Rotationally symmetrical components have the advantage that they can be manufactured simply without an unbalance, and are therefore particularly suitable as a rotating component for the transmission of torque.

The drive element and the output element can be arranged coaxially with respect to one another, in order to provide a direct and simple transmission of torque.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
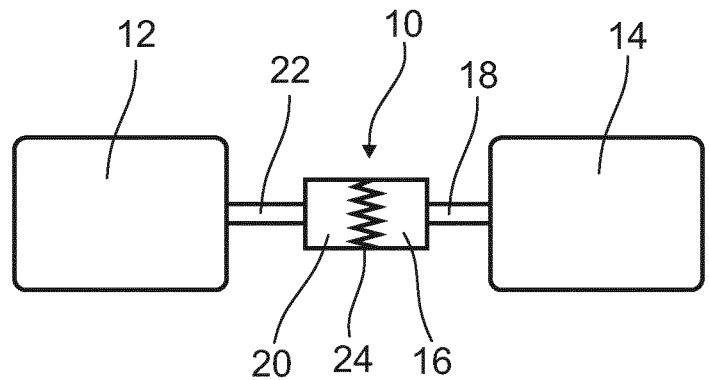
FIG. 1 is a diagrammatic illustration of a coupling device according to an embodiment of the invention which connects a transmission to an electric machine.

FIG. 1 shows a coupling device 10 which couples a transmission 12 to an electric machine 14 in a vehicle in a torque-transmitting manner.

The coupling device 10 comprises a drive element 16 which is coupled to a motor shaft 18 of the electric machine 14 in a torque-transmitting manner, and an output element 20 which is coupled to a transmission shaft 22 of the transmission 12 in a torque-transmitting manner.

The drive element 16 and the output element 20 are coupled to one another in a torque-transmitting manner via a Hirth toothing system 24. As an alternative, the drive element 16 and the output element 20 can be connected to one another via any desired toothing system or positively locking connection which provides a torque-transmitting coupling of the drive element 16 and the output element 20.

Figure 2:
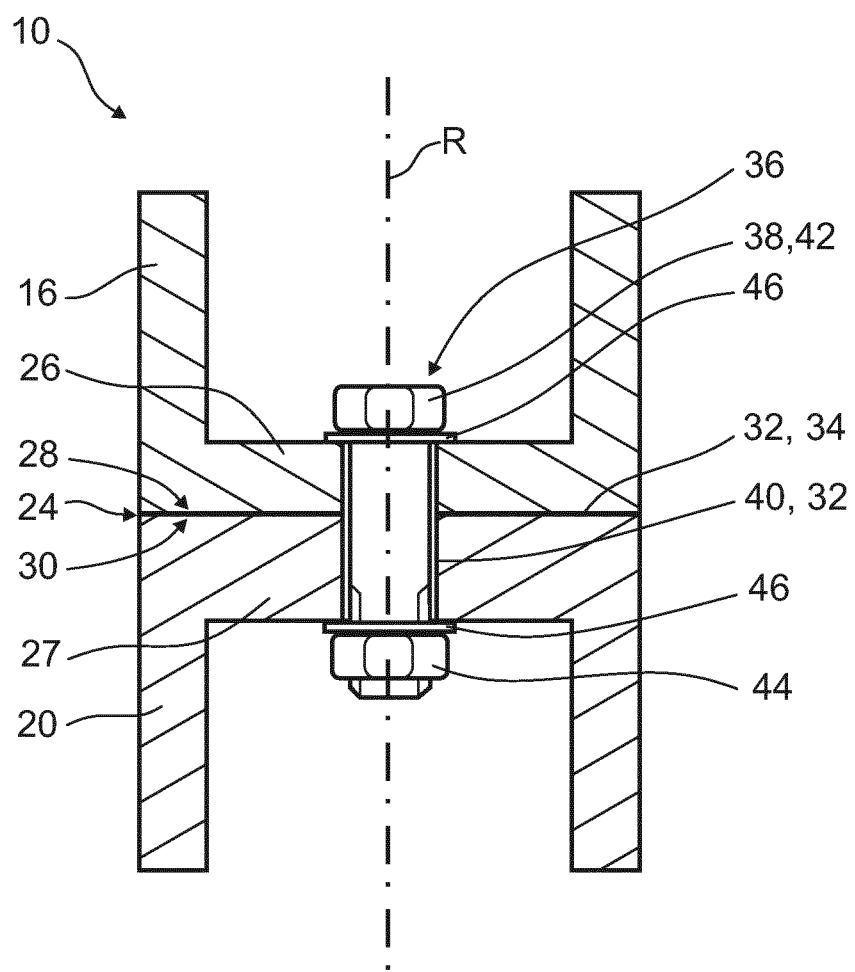
FIG. 2 is a sectional illustration of the coupling device from FIG. 1.

FIG. 2 shows the coupling device 10 in an axial section along the rotational axis R. The drive element 16 and the output element 20 in each case have a U-shaped profile and, apart from the toothing system 24, are of rotationally symmetrical formation with respect to the rotational axis R, that is to say they are sleeve-shaped. Furthermore, the drive element 16 and the output element 20 are arranged coaxially and rotated by 180° with respect to one another, with the result that the disk-shaped bottom 26 of the drive element 16 adjoins the disk-shaped bottom 27 of the output element 20.

The Hirth toothing system 24 is provided on the disk-shaped bottoms 26, 27, the bottom 26 of the drive element 16 having a toothing system 28, and the bottom 27 of the output element 20 having a corresponding counter-toothing system 30 which engage into one another in a positively locking manner and form the Hirth toothing system 24.

The toothing system 28 and the counter-toothing system 30 in each case have a coating 32 consisting of corundum which forms an electric insulator 34. Here, the electrically insulating layer 32 extends over the entire toothing system 28 and counter-toothing system 30, with the result that the drive element 16 is electrically insulated completely from the output element 20 by way of the electric insulator 34. This means that the drive element 16 and the output element 20 are in direct contact only via the insulating layer 32. As an alternative, merely the toothing system 28 or the counter-toothing system 30 can have the insulating layer 32, or in each case only one side of complementary sections of the toothing system 28 and the counter-toothing system 30 has the insulating layer 32, with the result that it is ensured even in this case that there are no contact faces between the drive element 16 and the output element 20 without an electrically insulating layer 32.

In one alternative embodiment, the electric insulator 34 can be a separate component which is arranged between the drive element 16 and the output element 20. Said component can be, for example, a ring made from insulating material which has a complementary toothing system with respect to the toothing system 28 and the counter-toothing system 30 and bears in a positively locking manner in each case against the toothing system 28 and the counter-toothing system 30.

As an alternative, the electric insulator 34 can be formed from any desired, preferably high strength, material with an electric conductivity of less than $10^7$ S/m, preferably of less than $10^6$ S/m, in particular of less than $10^4$ S/m.

In order for it to be possible for torques to be transmitted reliably, a fastening device 36 is provided which fastens the drive element 16 and the output element 20 to one another. The fastening device 36 comprises a screw 38 which extends in the axial direction through a through hole 40 which is provided both in the drive element 16 and in the output element 20 coaxially with respect to the rotational axis R. The screw 38 is fixed with a nut 44 at the end which lies opposite the screw head 42.

In each case one washer 46 made from an insulating material is arranged between the screw head 42 and the drive element 16 and between the nut 44 and the output element 20. Furthermore, the through hole 40 is coated with the same electrically insulating layer 32 as the toothing system 24, that is to say with corundum. As an alternative, the electrically insulating layer 32 can consist of another electrically insulating material with a low conductivity. This ensures that the screw 38 does not form a jumper bar between the drive element 16 and the output element 20, that is to say the fastening device 36 is insulated electrically with respect to the drive element 16 and the output element 20.

In addition or as an alternative to the electrically insulating coating 32, an insulator, for example in the form of a sleeve, can be arranged between the screw 38 and the drive element 16 or the output element 20 in the through hole 40.

In one alternative embodiment, a centering device can be provided for the fastening device 36, in order to prevent contact of the screw 38 with the drive element 16 and the output element 20. Said centering device is, for example, an axial recess in the drive element 16 and/or output element 20, which recess is provided to mount the washer/washers 46 in the radial direction, with the result that the screw 38 is mounted by means of the washer/washers 46 in a manner which is spaced apart from the drive element 16 and the output element 20 in all positions. In this case, an electrically insulating layer 32 or an insulator is not required in the through hole 40.

The drive element 16 and the output element 20 can be of identical formation with respect to one another, that is to say can be identical parts, which results in advantages during the production and in logistics.

A torque-transmitting connection can be established between a transmission 12 and an electric machine 14 by way of said design of the coupling device 10. The positively locking toothing system 24 and the fastening device 36 ensure that even great torques can be transmitted reliably. At the same time, the drive element 16 and the output element 20 are decoupled electrically from one another by way of the electric insulator 34, with the result that electromagnetic currents such as bearing currents and shaft voltages are not transmitted or are transmitted to merely a small extent. In this way, high EMC can be ensured.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A coupling device for a torque-transmitting connection of a transmission to an electric machine, comprising:
   a drive element;

an output element; and
an electric insulator,
wherein
the drive element and the output element are coupled to one another in a torque-transmitting manner,
the electric insulator is a coating formed on one or both of the drive element and the output element, and
the drive element and the output element are disconnected electrically from one another by way of the electric insulator.

2. The coupling device according to claim 1, wherein the electric insulator is an electrically insulating layer.

3. The coupling device according to claim 1, wherein the electric insulator has an electric conductivity of less than $10^7$ S/m.

4. The coupling device according to claim 1, wherein the electric insulator has an electric conductivity of less than $10^6$ S/m.

5. The coupling device according to claim 1, wherein the electric insulator has an electric conductivity of less than $10^4$ S/m.

6. The coupling device according to claim 1, wherein the drive element and the output element in each case have a toothing system, by which the drive element is coupled to the output element in the torque-transmitting manner.

7. The coupling device according to claim 6, wherein the toothing system is in each case a Hirth toothing system.

8. The coupling device according to claim 6, wherein the electric insulator is a coating which is provided at least in sections on the toothing system of the drive element and/or the output element.

9. The coupling device according to claim 1, wherein the coupling device comprises a fastener, by which the drive element and the output element are fastened to one another, and
the fastener is insulated electrically with respect to the drive element and the output element.

10. The coupling device according to claim 1, wherein the drive element and the output element are in each case of sleeve-shaped design.

11. The coupling device according to claim 10, wherein the drive element and the output element are arranged coaxially with respect to one another.

12. A coupling system, comprising:
a transmission;
an electric machine;
a coupling device that provides a torque-transmitting connection between the transmission and the electric machine,
wherein
the coupling device comprises a drive element connected to the electric machine, an output element connected to the transmission, an electric insulator, and
the drive element and the output element are coupled to one another in a torque-transmitting manner,
the electric insulator is a coating formed on one or both of the drive element and the output element, and
the drive element and the output element are disconnected electrically from one another by way of the electric insulator.

* * * * *